United States Patent
Kelly

(10) Patent No.: US 9,886,040 B1
(45) Date of Patent: Feb. 6, 2018

(54) SYSTEM AND METHOD FOR PLATFORM ALIGNMENT, NAVIGATION OR TARGETING

(71) Applicant: John T. Kelly, Murrieta, CA (US)

(72) Inventor: John T. Kelly, Murrieta, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 454 days.

(21) Appl. No.: 14/495,536

(22) Filed: Sep. 24, 2014

(51) Int. Cl.
*G01S 19/00* (2010.01)
*G05D 1/08* (2006.01)
*G01S 19/13* (2010.01)

(52) U.S. Cl.
CPC ............ *G05D 1/0891* (2013.01); *G01S 19/13* (2013.01)

(58) Field of Classification Search
None
See application file for complete search history.

(56) References Cited

U.S. PATENT DOCUMENTS

| | | | | |
|---|---|---|---|---|
| 4,866,450 A * | 9/1989 | Chisholm | ................. | G01S 1/10 342/33 |
| 4,939,663 A * | 7/1990 | Baird | .................... | G01C 21/005 342/64 |
| 5,361,212 A * | 11/1994 | Class | .................... | G01S 5/0009 244/114 R |
| 5,654,890 A * | 8/1997 | Nicosia | ................ | G01C 21/165 342/118 |
| 5,657,009 A * | 8/1997 | Gordon | ................ | G01C 23/005 340/968 |
| 5,714,948 A * | 2/1998 | Farmakis | ............ | B60R 25/1025 340/961 |
| 5,952,961 A * | 9/1999 | Denninger | ............ | G01S 7/4004 342/357.3 |
| 6,094,607 A * | 7/2000 | Diesel | .................. | G01C 21/165 342/355 |
| 6,182,005 B1 * | 1/2001 | Pilley | ..................... | G01C 23/00 342/36 |
| 6,246,960 B1 * | 6/2001 | Lin | ....................... | G01C 21/165 701/472 |
| 6,311,108 B1 * | 10/2001 | Ammar | ................. | F41G 7/2226 244/180 |
| 6,311,129 B1 * | 10/2001 | Lin | .......................... | G09B 9/08 342/422 |
| 6,405,107 B1 * | 6/2002 | Derman | ............... | G01C 21/005 340/3.5 |
| 6,492,934 B1 * | 12/2002 | Hwang | .................. | G01C 5/005 342/104 |
| 6,512,976 B1 * | 1/2003 | Sabatino | ............. | G01C 21/005 342/357.36 |

(Continued)

*Primary Examiner* — Jonathan M Dager
(74) *Attorney, Agent, or Firm* — Donna P. Suchy; Daniel M. Barbieri

(57) ABSTRACT

Systems and methods can be utilized to align or provide targeting for a platform. One alignment system and method can receive first electronic data indicative of attitude of the platform and can receive second electronic data related to a position on the platform. The alignment system and method can provide third electronic data indicative of an adjusted attitude of the platform in response to the first electronic data and a slope vector or terrain data. The targeting system and method can use position differencing between a platform and a remote observer to aim at a target.

11 Claims, 7 Drawing Sheets

(56) References Cited

U.S. PATENT DOCUMENTS

| Patent/Publication | Date | Inventor | Classification |
|---|---|---|---|
| 6,571,155 B2* | 5/2003 | Carriker | G05D 1/101 340/974 |
| 6,639,541 B1* | 10/2003 | Quintana | G01S 19/21 342/18 |
| 6,912,464 B1* | 6/2005 | Parker | G01C 21/005 701/500 |
| 7,089,092 B1* | 8/2006 | Wood | G01S 19/15 342/33 |
| 7,337,650 B1* | 3/2008 | Preston | B60W 40/11 73/1.38 |
| 8,666,589 B2* | 3/2014 | Munnix | B60W 40/10 701/30.2 |
| 8,928,527 B2* | 1/2015 | He | G01C 21/005 342/357.3 |
| 9,019,156 B2* | 4/2015 | Watanabe | G01S 19/48 342/357.31 |
| 9,127,947 B2* | 9/2015 | Minor | G01C 21/16 |
| 9,139,307 B2* | 9/2015 | Sridhar | B64D 43/00 |
| 9,304,198 B1* | 4/2016 | Doerry | G01S 13/88 |
| 9,459,103 B2* | 10/2016 | Sato | G01C 21/12 |
| 9,459,277 B2* | 10/2016 | Hergesheimer | G01P 21/00 |
| 9,494,428 B2* | 11/2016 | Mizuochi | G01C 21/16 |
| 2001/0020216 A1* | 9/2001 | Lin | G01C 21/165 701/472 |
| 2002/0147542 A1* | 10/2002 | Tomescu | G01S 5/0063 701/120 |
| 2003/0135327 A1* | 7/2003 | Levine | G01C 21/165 701/500 |
| 2004/0225432 A1* | 11/2004 | Pilley | G01C 23/00 701/117 |
| 2004/0231901 A1* | 11/2004 | Shuniak | B60V 1/08 180/116 |
| 2005/0004723 A1* | 1/2005 | Duggan | G05D 1/0061 701/24 |
| 2005/0182530 A1* | 8/2005 | Murphy | G01S 19/15 701/16 |
| 2005/0240347 A1* | 10/2005 | Yang | G01C 21/16 701/500 |
| 2005/0246071 A1* | 11/2005 | Chamas | G01C 23/005 701/3 |
| 2006/0025899 A1* | 2/2006 | Peckham | G01C 21/20 701/3 |
| 2006/0214816 A1* | 9/2006 | Schell | G01S 13/9303 340/961 |
| 2006/0271250 A1* | 11/2006 | Dubeck | G05D 1/0676 701/16 |
| 2006/0293853 A1* | 12/2006 | Chiou | G01S 7/40 701/480 |
| 2007/0010940 A1* | 1/2007 | Tan | G01C 21/20 701/469 |
| 2007/0032950 A1* | 2/2007 | O'Flanagan | G01C 21/165 701/472 |
| 2008/0071469 A1* | 3/2008 | Caveney | G01C 21/165 701/501 |
| 2008/0269988 A1* | 10/2008 | Feller | A01B 69/007 701/41 |
| 2008/0284643 A1* | 11/2008 | Scherzinger | G01C 21/005 342/357.31 |
| 2009/0093959 A1* | 4/2009 | Scherzinger | G01C 21/165 701/470 |
| 2009/0099730 A1* | 4/2009 | McClure | A01B 69/008 701/41 |
| 2009/0254279 A1* | 10/2009 | Han | G01C 21/16 701/501 |
| 2010/0082248 A1* | 4/2010 | Dorum | G01C 21/32 701/533 |
| 2010/0117867 A1* | 5/2010 | He | G01C 23/00 340/974 |
| 2010/0256840 A1* | 10/2010 | Call | G01C 21/165 701/17 |
| 2010/0312461 A1* | 12/2010 | Haynie | B61L 25/025 701/117 |
| 2010/0318292 A1* | 12/2010 | Kulik | G01C 21/165 701/414 |
| 2011/0125404 A1* | 5/2011 | Czompo | G01C 21/165 701/472 |
| 2011/0202225 A1* | 8/2011 | Willis | G01C 21/165 701/31.4 |
| 2011/0275408 A1* | 11/2011 | Kulik | G01C 17/34 455/556.1 |
| 2011/0298658 A1* | 12/2011 | Riley | G01S 5/0236 342/357.26 |
| 2012/0022780 A1* | 1/2012 | Kulik | G01C 21/28 701/498 |
| 2012/0146847 A1* | 6/2012 | Janky | G01S 19/07 342/357.23 |
| 2012/0303222 A1* | 11/2012 | Cooprider | B60W 10/06 701/48 |
| 2013/0110389 A1* | 5/2013 | Solbrack | B60G 17/01908 701/124 |
| 2014/0324291 A1* | 10/2014 | Jones | A01B 9/007 701/41 |
| 2015/0145720 A1* | 5/2015 | Matthews | G01S 19/53 342/357.36 |
| 2015/0197247 A1* | 7/2015 | Ichinokawa | B60W 30/143 701/93 |
| 2015/0203120 A1* | 7/2015 | Liang | B60W 50/14 701/34.4 |
| 2015/0269438 A1* | 9/2015 | Samarasekera | G06K 9/00637 382/154 |
| 2015/0314780 A1* | 11/2015 | Stenneth | B60W 30/00 701/23 |
| 2016/0016564 A1* | 1/2016 | Otake | B60W 40/076 701/75 |
| 2016/0047657 A1* | 2/2016 | Caylor | G01C 21/005 701/521 |
| 2016/0047675 A1* | 2/2016 | Tanenhaus | G01C 25/005 702/104 |
| 2016/0350927 A1* | 12/2016 | Ma | G06T 5/002 |
| 2017/0052261 A1* | 2/2017 | Loomis | G01C 21/20 |

* cited by examiner

SYSTEM AND METHOD FOR PLATFORM ALIGNMENT, NAVIGATION OR TARGETING

The present disclosure relates generally to platform alignment, navigation, and/or targeting including but not limited to systems and methods that enable or maintain platform alignment or enable targeting or the determination of a remote offset position from an initial position.

Personnel and platforms, such as vehicles and drones, include embedded or mounted sensors, weapons or other elements. The alignment of the platform as well as any embedded or mounted sensors, weapon, or other elements can be affected by terrain or other environment factors.

Conventional systems and methods of alignment rely primarily on the presence and use of sensing devices disposed on the platform. The sensing devices attempt to provide an estimate of the current attitude of the platform and enable reactive feedback to environmental dynamics to maintain an alignment or pose of the platform.

Maintaining azimuthal and elevation-based alignment of the primary platform or the secondary element can be important to achieve or maintain a pointing solution or targeting solution to a position of interest, especially when the platform is under dynamic travel. Conventional systems and methods provide a feedback control of the platform using near-real time sensor measurements and the desired attitude pose, position, and azimuth/elevation. Sensor-based alignment for the platform can be inaccurate. Sensor devices utilized for these conventional sensor-based alignment systems and methods vary greatly in attribute (e.g., motion, velocity azimuth, gradient), form (e.g., inertial, odometry, global navigation satellite system (GNSS)), or modality (e.g., motion, mass, optic, or radio frequency/radar assessment, magnetic detection). The variability of sensor devices in sensor-only-based conventional alignment systems and methods render solutions that are variable in capability, response, accuracy and cost. The variability of sensor devices also adversely affects scaling applicability to different platforms and uses.

According to one example of an alignment application, a camera traveling in a vehicle over changing terrain is held level. Holding the camera level requires the use of sensor devices to provide feedback related to the attitude of the vehicle. The sensor devices must rapidly sample the position, speed and attitude of the platform to provide appropriate feedback. The sampling time and processing speed requirements for the sensor devices and associated electronics increase with platform speeds.

High processing speeds are necessary to achieve an estimate of attitude changes and to generate dampening and to provide corrective reactions to the attitude changes, especially at higher vehicle speeds. The measurements of the sensor devices can suffer due to their reactive nature and are ultimately delayed from real time in any dynamic situation, thereby reducing the accuracy of the alignment systems and methods when the vehicle is in motion. Further, complexity associated with coupling the sensor devices for attitude and position (commonly referred to as "tight coupling") increases when attempting to provide potential alignment adjustments projected in time. In addition, separate and unique tuning of the sensor devices depending on the type sensor devices increases complexity of the alignment systems and methods. Conventional sensor-based alignment systems and methods often incur large swings in attitudinal adjustments and other challenges when aiding control processes using feedback loops to maintain a desired pose or alignment especially while in motion, which may overestimate errors, thereby resulting in limited predicted success of such systems and methods and adverse impacts to overall performance.

Alignment is important in targeting applications. Conventional targeting systems and method can use a remote observer to allow a platform to aim at a target even though the line of site to the target is degraded or blocked, or even though the target is the beyond line of site. Conventional targeting systems and methods include assets (e.g., the platform and the remote observer) that independently derive their own position without accuracy correlation between assets and that derive their own alignment adjustments and end targeting solutions without accuracy correlation (e.g., a one way process).

Thus, there is the need for an alignment systems and methods for a primary platform and/or a secondary element or secondary platform used with the primary platform that do not depend on the feedback of sensor devices. Further, there is a need for alignment systems or methods that enable or maintain desired platform or element alignment using predicted terrain database-derived slope information for ahead of real time response without dependency on the feedback of real time sensor devices. Further still, there is a need for alignment systems and methods that use a geo-located terrain database to enable determination of a slope vector in an azimuthal direction emanating from the location of the platform. Further still, there is a need for alignment systems and methods that provide higher accuracy in dynamic environments. Yet further still, there is a need for a system and method that anticipates changes in azimuth or elevation attitude ahead of real time arrival of such changes.

Additionally, there is a need for targeting systems and methods that correlate accuracy between a remote observer and one or more platforms. Yet further still, there is a need for targeting systems and methods that use position differencing and/or azimuthal/elevation alignment algorithms to more accurately aim to the target. Even further, there is a need for a distributed targeting systems and methods that provides a targeting solution from one or more remote observers to one or more platforms.

SUMMARY

In one aspect, inventive concepts disclosed herein relate to a method of aligning a platform. The method includes receiving first electronic data indicative of attitude of the platform and receiving second electronic data related to a position of the platform. The method also includes providing a slope vector associated with terrain electronic data in a terrain electronic database and providing third electronic data indicative of an adjusted attitude of the platform in response to the first electronic data and the slope vector. The slope vector is associated with the second electronic data.

In another aspect, inventive concepts disclosed herein relate to a system for aligning a platform. The system includes an attitude unit for providing first electronic data indicative of an attitude of a platform, a position unit for providing second electronic data related to a position of the platform, and a terrain electronic database for providing terrain data associated with terrain in the vicinity of the platform. The terrain data is provided in response to the second electronic data. The system also includes an alignment unit for providing third electronic data indicative of an adjusted attitude of the platform in response to the first electronic data and the terrain data.

In a further aspect, inventive concepts disclosed herein relate to a method of targeting. The method includes providing first electronic data indicative of a position of a target at a remote observer and receiving second electronic data indicative of a position of a platform. The method also includes providing third electronic data to the platform using difference estimates associated with a position of the remote observer and the second electronic data.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION

Figure 1:
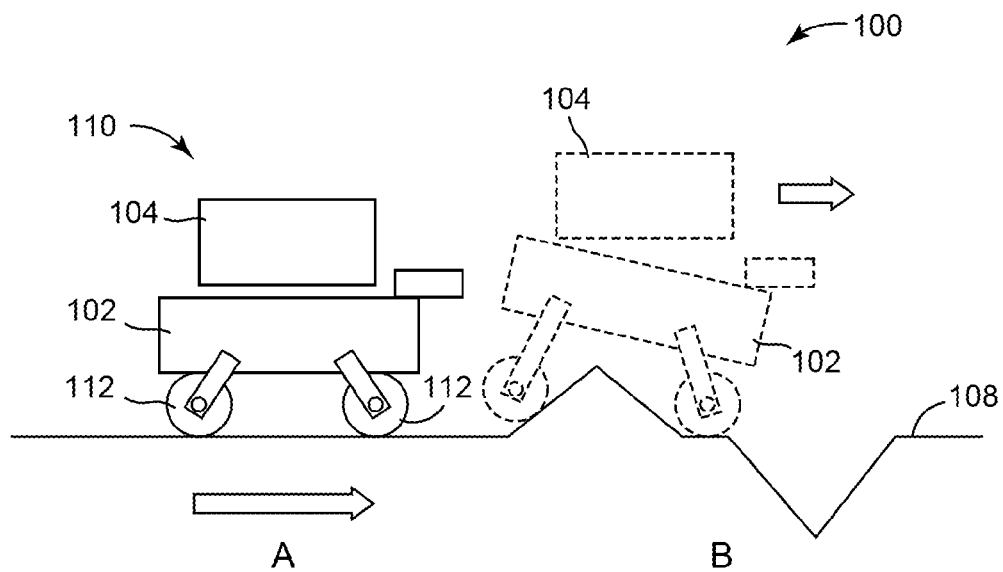
FIG. 1 is a schematic illustration of a platform including a sensor or a weapon traveling from point A to point B.

Referring generally to FIGS. 1-8, systems and methods for aligning a platform or user and systems and methods for performing targeting from a platform a user are disclosed. In one or more embodiments, the platform can be a single platform, a primary platform including an element, a secondary platform associated with a primary platform, a secondary platform including an element, or a combination of a primary platform and a secondary platform. In one or more embodiments, the element associated with the primary platform or secondary platform can be a weapon (e.g., a firearm, mortar, cannon, or other weapon), a sensor (e.g., a camera, a laser sensor, a radar or other sensing device), or other element. The weapons can be an intelligence gathering device, a surveillance device, and a reconnaissance (ISR) device and can be a less-than-lethal device (e.g., a water cannon), or any other form of aimed device. The secondary platform can be an independently rotating element, such as a turret, in one or more embodiments.

The systems and methods advantageously provide a rapidly implementable solution to enable or maintain a desired user, platform or element alignment using predicted terrain database derived slope information for ahead of real time response with no or little delay and without or with less dependency on feedback sensor devices in one or more embodiments. In one or more embodiments, the ability to access vertical elevation data from an appropriately geo-located terrain database enables the determination of slope vector estimates in any azimuthal direction emanating from the location of the user or the platform. In some embodiments, the slope vectors may be generated predictably from the current position and velocity of the user or platform and provide attitudinal estimates applicable for maintaining stability or anticipating and adjusting alignment of the user or platform at alternative positions or when in transit or dynamic travel. In some embodiments, the slope vectors can be projected along a proposed route or set of possible routes from the current position of the platform or user using current and perspective change estimates in the velocity and direction of the platform or user.

In some embodiments, the ability for a user, a platform, or an element on the platform, such as a sensor or weapon, to anticipate changes in its azimuthal or elevation attitude ahead of real time arrival provides more accurate alignment and navigation. The anticipated changes can be determined earlier than a conventional sensor-based alignment system in some embodiments. In some embodiments, access to the terrain database provides a mechanism to determine slope-based general platform attitude and operational bounds ahead of real time conditions, thereby reducing dependency on high cost sensor devices which can only provide reacting feedback relative to the current position's attitude.

In some embodiments, the systems and methods of platform alignment and navigation can improve operational accuracy when under conditions of transit or in motion by using anticipatory estimation of attitude bounds from which related control processes may maintain alignment. In one or more embodiments, the systems and methods of platform alignment and navigation aiding can improve navigation performance by providing drift free position and directional estimates used as error boundaries over time.

While the disclosed systems and methods are described primarily with regard to land vehicles, the systems and methods may also be configured for use in other platforms or for use by users. For example, a user may be a civilian (e.g., a police officer, a firefighter, etc.) or soldier, and the platform can be a marine vessel, a drone, a robot or a rail or track mobile unit.

In one or more embodiments, a targeting system can provide sufficient targeting guidance to nearby but line of sight disabled or impaired users or platforms by providing location from a remote location that can be automatically adjusted for the desired sensor or weapon of interest. Systems and methods use distributed techniques to significantly increase the force presentation of individually remotely deployed assets lacking lines of sight to desired targets in one or more embodiments. In one or more embodiments, the systems and methods can decrease the time to sense targets and/or apply weapons to the targets from such platforms. The systems and methods are adaptable to various methods of location or attitude determination. The systems and methods can utilize various communication approaches.

In one or more embodiments, the system methods can be used in military applications including select sniper systems, grenade launching systems, military/artillery battery systems, unmanned ground/aerial platform weapon systems, and select naval battery systems. In civilian applications, the targeting systems and methods can be used to aim directed individual sensors, first responder sensors, non-lethal ballistic deployments, or unmanned platform directions.

With reference to FIG. 1, an environment 100 can include a platform 102, such as, a vehicle, and an element 104 in some embodiments. Element 104 can be a sensor, weapon or other device. Element 104 can be mounted or fixed on platform 102 in some embodiments. Element 104 is mounted or fixed on a secondary platform such as a turret in some embodiments.

Platform 102 can travel from a point A to a point B over terrain 108 which includes changes in elevation. Platform 102 and element 104 undergo attitudinal changes as wheels 112 interact with terrain 102. In one or more embodiments, element 104 can maintain a separate attitude from platform 102 regardless of the heading and traversal changes associated with platform 102. In one or more embodiments, the attitude of element 104 is the same as or in a relationship with the attitudinal solution of platform 102.

In some embodiments and as shown in FIG. 1 in dashed lines, element 104 maintains its attitude as it travels from point A to point B across terrain 108 even though the attitude of platform 102 changes. In some embodiments, platform 102 or element 104 includes a system and method for maintaining attitude of element 104 as it travels from point A to point B. Suspension associated with wheels 112 can be anticipatorily or predictably adjusted to ensure that platform 102 maintains its alignment. In other embodiments, element 104 can have a suspension system between platform 102 and element 104, so that element 104 can be adjusted with respect to platform 102 to maintain its attitude as platform 102 travels across terrain 108.

Figure 2:
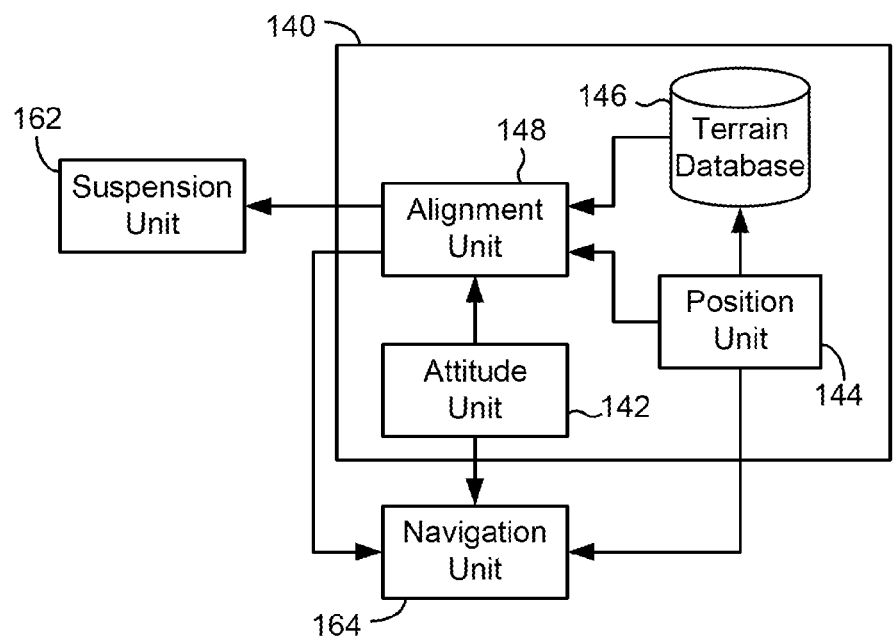
FIG. 2 is a block diagram of an alignment system for the platform illustrated in FIG. 1, in accordance with an exemplary embodiment.

With reference to FIG. 2, a control system 140 can be utilized with a user or with platform 102 or element 104 to ensure alignment as the user or platform 102 travels across terrain 108 (FIG. 1). In some embodiments, control system 140 includes an attitude unit 142, a position unit 144, a terrain database 146, and an alignment unit 148. Control system 140 can be coupled to a suspension unit 162 associated with platform 102 or element 104 and a navigation unit 164 associated with platform 102 or element 104.

Control system 140 includes processing electronics and memory for implementing the operations described herein in some embodiments. Control system 140 is implemented as a computing device executing software stored in non-transitory medium according to some embodiments. Control system 140 includes one or more microprocessors, application specific integrated circuits (ASIC), a circuit containing one or more processing components, a group of distributed processing components, circuitry for supporting a microprocessor, communication circuits, input/output interfaces, or other hardware configured for processing in some embodiments. The memory can be any volatile or non-volatile computer-readable storage medium capable of storing data or computer code relating to the activities described herein. Control system 140 includes hardware interfaces (e.g., bus interfaces) for communicating data to and from attitude unit 142, position unit 144, terrain database 146, alignment unit 148, suspension unit 162, navigation unit 164, or sensors associated therewith in some embodiments.

Navigation unit 164 is responsible for controlling velocity, position, heading, elevation, and other navigation of platform 102 and element 104 in some embodiments. Navigation unit 164 can track and provide a route of travel for platform 102 in some embodiments. Navigation unit 164 can include controls for controlling the movement and travel of platform 102. Control system 140 can be integrated with navigation unit 164 or be a separate system from navigation unit 164. Navigation unit 164 receives commands or data from control system 140 to cause platform 102 to move or to change the attitude of element 104 or platform 102 based upon alignment considerations in some embodiments. Navigation unit 164 receives data indicative of position from position unit 144 or attitude unit 142 for use in performing navigation operations in some embodiments.

Suspension unit 162 coordinates with navigation unit 164 to adjust attitude of platform 102 or element 104 in some embodiments. In some embodiments, suspension unit 162 adjusts the attitude of platform 102 independent of navigation unit 164. Suspension unit 162 receives commands or data from control system 140 to cause platform 102 or element 104 to change attitude based upon alignment considerations in some embodiments. In some embodiments, suspension unit 162 can adjust the roll, pitch, elevation, or yaw of platform 102 or element 104. Suspension unit 162 includes electronic and hydraulic components for adjusting the roll, pitch, elevation, or yaw of platform 102 or element 104 in some embodiments.

Attitude unit 142 determines the heading or azimuth of platform 102 or element 104 in some embodiments. In some embodiments, attitude unit 142 determines a heading of platform 102, determines a relative heading for element 104, and calculates the absolute heading for element 104 from the heading of platform 102 and the relative heading of element 104. Attitude unit 142 utilizes data from global navigation satellite systems, compasses, or other heading or azimuth sensors to determine heading in some embodiments. Attitude unit 142 provides electronic alignment data to alignment unit 148 indicative of the heading and/or azimuth in some embodiments.

Attitude unit 142 provides other alignment data (e.g., yaw, pitch, and roll) of platform 102 and element 104 in some embodiments. The alignment data can also be provided to navigation unit 164 for navigation operations. Attitude unit 142 includes one or more sensors configured to generate sensor data regarding the attitude (e.g., heading, yaw, pitch, or roll) of platform 102 or element 104 in some embodiments. For example, attitude unit 142 includes a tilt sensor, an azimuth sensor, one or more accelerometers, one or more gyro-sensors, and a heading sensor. Attitude unit 142 may also include sensors for determining height above terrain or geoidal mass (e.g. barometer, GNSS sensor) in some embodiments. Attitude unit 142 also includes processing electronics configured to receive and process sensor data from the sensors in one or more embodiments. The sensor data is generated continuously and sampled by attitude unit 142. The sensor data can be provided by any form of sensors configured to measure movement, location, pitch, heading, roll, yaw, and/or other orientation. The sensors can include optical, mechanical, electro-mechanical, or other forms of sensors.

Position unit 144 is an inertial navigation system, global navigation satellite system, or any other device for determining a position of platform 102 or element 104 in some embodiments. Position unit 144 provides altitude and additional heading information to alignment unit 148 and attitude unit 142 in some embodiments. Position unit 144 provides electronic data to alignment unit 148 indicative of the position or future position of platform 102 or element 104 in some embodiments. Alignment unit 148 or position unit 144 provides the position to terrain database 146 in some embodiments. The electronic data indicates a latitude, longitude, and elevation or other indication of position in two or three dimensions in some embodiments. Alignment unit 148 or position unit 144 calculates a future position based on the electronic data and other navigation data in some embodiments.

Terrain database 146 provides terrain information to alignment unit 148 in response to the electronic data representing position or future position in some embodiments. In some embodiments, platform 102 or element 104 includes a display which receives the terrain database information. In one embodiment, alignment unit 148 receives slope vectors or information for calculating slope vectors related to change in elevation from terrain database 146 as platform 102 travels from point A to point B across terrain 108 (FIG. 1).

Alignment unit 148 uses the slope vectors to calculate adjustments to attitude in some embodiment. Alignment unit 148 adjusts the attitude information and provides an adjusted attitude so that platform 102 and element 104 can maintain alignment while undergoing attitudinal effects from dynamic traversal over terrain 108. The adjustments to attitudinal data can be provided to suspension unit 162 and/or navigation unit 164 to make adjustments to the attitude of platform 102 or element 104 in some embodiments. The attitudinal data can include one or more of a roll parameter, a pitch parameter, tilt parameter, elevation angle parameter, a heading parameter, an azimuth parameter, an elevation parameter or other navigational parameters.

Figure 3:
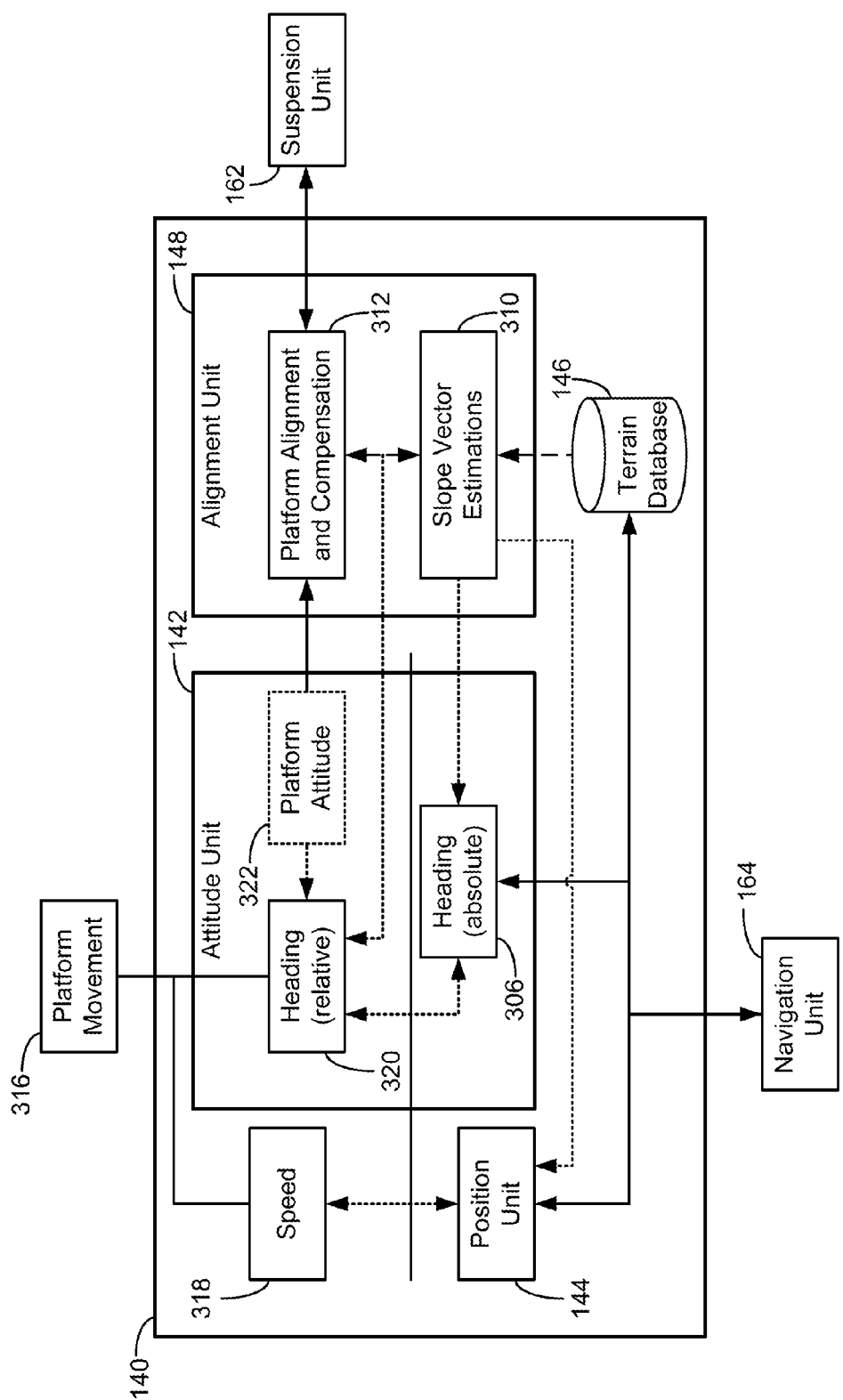
FIG. 3 is a more detailed block diagram of the alignment system illustrated in FIG. 2.

With reference to FIG. 3, control system 140 includes alignment unit 148 including a platform and alignment compensation module 312 and a slope vector estimation module 310 in some embodiments. Attitude unit 142 includes a platform attitude module 322, a relative heading module 320, and an absolute heading module 306 in some embodiments.

Position unit 144 is coupled to a speed module 318, terrain database 146 and slope vector estimation module 310 in some embodiments. Relative heading module 320 is coupled to platform and alignment compensation module 312, slope vector estimation module 310, platform attitude module 322, and absolute heading module 306 in some embodiments. Platform and alignment compensation module 312 is coupled to slope vector estimation module 310 and platform attitude module 322. Terrain database 146 is coupled to slope vector estimation module 310 in some embodiments. Navigation unit 164 is coupled to position unit 144, absolute heading module 306 and terrain database 146 in some embodiments.

Platform and alignment compensation module 312, slope vector estimation module 310, platform attitude module 322, relative heading module 320, speed module 318 and absolute heading module 306 can be software modules, sensor systems, sensors, or combinations thereof for providing signals or data in control system 140. Platform movement 316 can be measured with respect to velocity or speed by speed module 318 and with respect to heading by relative heading module 320 in some embodiments. Relative heading can be determined using data related to the current heading and other attitude parameters available to platform attitude module 322 in some embodiments. A velocity or speed parameter is provided to position unit 144 for determining the position data. The position data is provided to absolute heading module 164 and terrain database 146.

Absolute heading module 306 receives the position data and determines absolute heading in response to the position or changes in the position. The absolute heading is provided to platform navigation unit 164 for navigation operations. Navigation unit 164 also receives terrain data and absolute position data for navigation operations. The absolute position data can be expressed as a latitude, longitude and elevation or other grid-based representation.

Platform movement 316 can also result in a change in platform attitude module 322. Slope vector estimations from slope vector estimation module 310 are utilized to provide platform alignment and compensation data using platform alignment and compensation module 312. The platform alignment and compensation data can be provided to relative heading module 320 for relative heading parameter adjustments as well as to navigation unit 164 or suspension unit 162 to make compensating physical adjustments to platform 102 or element 104 (FIG. 1).

In one or more embodiments, the platform alignment and compensation data is predictive and is provided in response to slope vectors. The slope vectors can be provided directly from terrain data base 146 or can be derived from elevation data in terrain database 146. The slope vectors can be directional slope vectors.

In some embodiments, the platform alignment and compensation data includes one or more of elevation, azimuth, pitch, roll and yaw parameters. In one embodiment, the directional slope vector can be applied as a translated platform alignment attitudinal adjustments in elevation and azimuth. In some embodiments, the translated platform alignment attitudinal adjustments can be provided ahead of real-time traversal of platform 102 (FIG. 1), thereby decreasing swing magnitude from compensation mechanisms and increasing the time of response available to project for alignment adjustments. The decrease in swing magnitude from the compensation mechanism and the increase of timely response renders improved retention of alignment during traversal in some embodiments.

In one or more embodiments, the slope vector can also be applied to absolute heading module 306, relative heading module 320, and position unit 144 to improve position and heading determinations. In one or more embodiments, the slope vectors can be utilized in an inertial measurement unit (IMU) application to provide error boundary limits for referencing and maintaining navigational accuracy over traversals without the issue of sensor-based drift endemic to inertial measurement unit-based aiding solutions.

Figure 4:
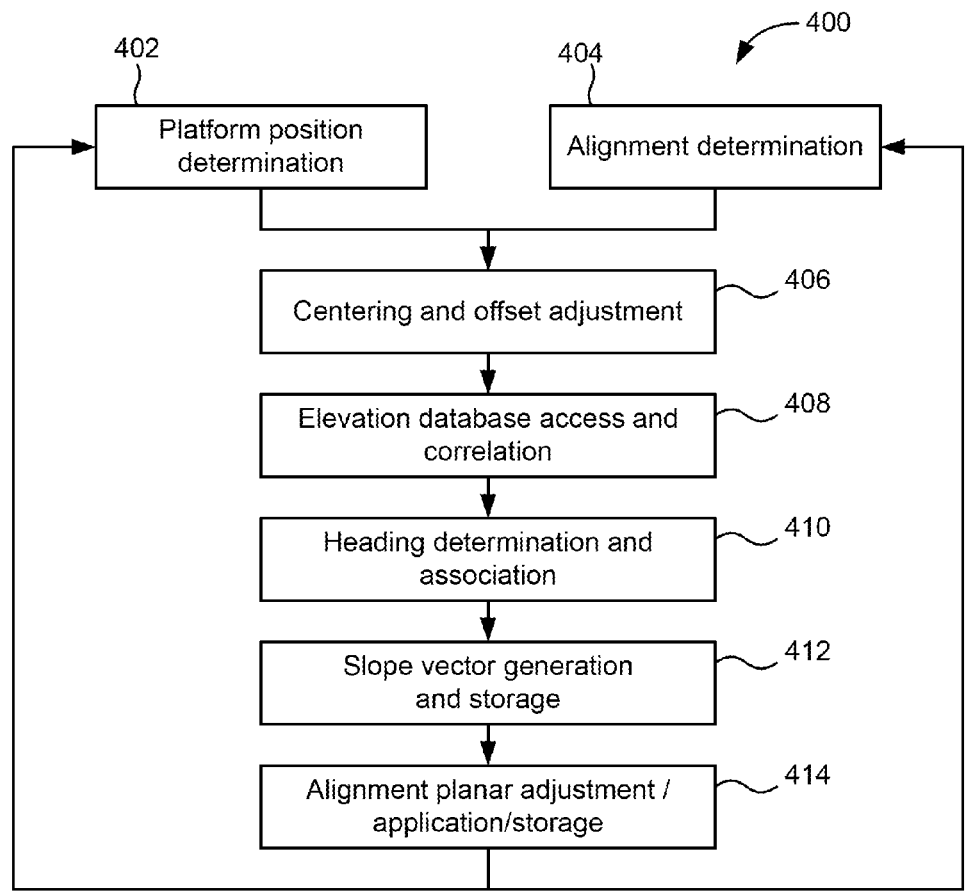
FIG. 4 is a flow diagram of an alignment process for use by the platform illustrated in FIGS. 1, 2, and 3, according to another exemplary embodiment.

With reference to FIG. 4, control system 140 (FIG. 3) of element 104 or platform 102 can operate according to a flow diagram 400 in one or more embodiments. Flow diagram 400 can be implemented using software modules implemented on the various components of FIG. 4 in one embodiment At an operation 402, position unit 144 determines the position of platform 102 or element 104. The position can be determined using relative or absolute positioning systems. Centricity of each component of platform 102 and/or element 104 and its correlation can be stored for all position calculations. A mathematical model of platform 102 and/or element 104 can be maintained for position determinations in some embodiments. According to one example, the correlated position of the center of motion of platform 102 (embodied as a land vehicle) and the position of the center of element 104 (embodied as a turret) can be obtained and maintained by position unit 144 embodied as a global navigation satellite system-based device. In some embodiments, the position data may include altitude data.

At an operation 404, alignment unit 142 determines the alignment of element 104 or platform 102. Operation 404 determines a desired azimuth and elevation pertinent to a projected location in some embodiments. Flow diagram 400 operates to maintain the alignment at a desired alignment (e.g., a desired alignment vector) in some embodiments. In some embodiments, the desired alignment is for element 104. According to one example, element 104, embodied as a turret, has an alignment (e.g., alignment data embodied as an alignment vector) conforming to a desired trajectory or a line-of-sight vector from the center of the turret to a target position. The heading of platform 102 can be obtained via position differencing and velocity monitoring or via sensor-based heading measurement methods in some embodiments. The azimuth and elevation of element 104 are provided by platform monitoring sensors in some embodiments.

At an operation 406, centering and offset adjustments for a calculation of the alignment vector can be performed for the alignment data of operation 404 and the position data of operation 402. Operation 406 provides positional vector offsetting from the position of the sensing element of position unit 144 (FIG. 3) to the center of interest of element 104 and from the position of the sensing element of position unit 144 to the origination point of the alignment vector if platform 102 is uncorrelated with element 104 in some embodiments. Level arm distance offsets can be applied in vector directions to enable correlation of the position of platform 102 to the location interest of element 104 in some embodiments. In some embodiments, the offset adjustments can be applied using a dynamic model of the components of platform 102 and element 104. The heading of platform 102 can be translated to element 104 using the direction of dynamic motion or using a mathematical model of platform 102 and element 104 in some embodiments.

At an operation 408, terrain database 146 can be accessed to receive elevation data associated with the position of platform 102 or element 104 and/or elevation data associated with a position of interest projected from the position of platform 102 or element 104. The centered and offset adjustments to position provided in operation 406 can be utilized when providing a position to terrain database 146. In operation 408, the information from terrain database 146 can be comprised of database elements, such as, digital terrain elevation (DTED) elements. The elevation database elements can utilize gridded/arrayed elevation measurements that correlate to unique reference positions. Position relatable elevations are created and made available in three dimensional representations, enabling differencing to create directional vector elements.

The resolution of terrain database 146 can be related to the separation distance of gridded measurement locations. In some embodiments, separations are 60 meters, 30 meters, 10 meters, 3 meters and greater than 1 meter in localized and globally available digital terrain elevation database products. A grid of position relatable elevations can be presented in an eight cardinal point array from 0, 45, 90, 35, 189, 220, 270, and 315 degrees from any centrally referenced (e.g., center of the array) position in some embodiments. The position correlation is applied to adjust the available elevation database element to correlate to the current position of platform 102 in some embodiments. The position correlation process can be performed via the use of differencing the current position to the closest three database locations in radial direction and reforming a weighted three dimensional measurement in some embodiments. In some embodiments, the position elevation correlation process can include a scale or weighting applied to the resulting measurement that is proportional to the closest cardinal point elevations derived from terrain database 146.

At an operation 410, heading determination and association is provided. In operation 410, the desired (e.g. planned or in motion) route of platform 102 defines a heading which may be determined by measurement or position differing methods to enable a desired direction for predictive slope estimation. If a route is established, projected slope vectors may be generated prior to traversal and stored to enable a priority bounding of the alignment of element 104 and the navigation of platform 102 in one or more embodiments. As the heading changes during traversal, new slope vectors may be generated and applied in one or more embodiments.

In an operation 412, the elevation database grid structure enables the differencing in elevations to occur along cardinal directions from a central position to enable predictive slope-based attitudinal estimations in some embodiments. The predictive slope-based estimations can be provided in vector form (e.g., as slope vectors) and related to the current location and alignment of platform 102 to provide adjustments in pitch, roll and yaw parameters in vector form to be applied to the alignment of element 104 for azimuth and elevation in some embodiments. As each elevation measurement is correlated to a stored reference position or a reference position (e.g., a current reference position in three dimensions (x, y, z)) provided via the database correlation element process, each measurement may be differenced from the centric or current location in common reference frame to develop a result in vector format. The result in vector form creates a direction-correlated estimate of change of elevation or slope whose magnitude may be positive or negative depending upon the rise or fall in difference, respectively, in some embodiments. If the heading of interest for the vector difference corresponds to the available eight cardinal directions, the unadjusted estimates in the database may be utilized as described in some embodiments. However, if the desired direction of slope estimation due to heading is not associated with the cardinally associated database array measurement, an elevation adjustment similar to the elevation database position correlation element is applied using a weighted sum of elevations related to the two closest cardinal direction database elements with the weighting proportionally favoring the closest measurement elevation while reducing the farther elevation measurement by an inverse proportion in some embodiments.

At an operation 414, a gradient vector is generated and stored. To relate the slope vector's impact on primary platform 102 to element 104, the slope vector is compared to pointing vector (e.g., azimuth and elevation) of element 104 to estimate a gradient vector in some embodiments. The gradient vector can be created using a dynamic model of components of platform 102 and element 104 in some embodiments. The gradient vector can provide the rate of change for the created plane between the two vectors in some embodiments. The gradient vector can take the form of partial derivatives represented in the local coordinate frame and can be related via directional cosigns to create directional derivatives relevant to changes in alignment vector subcomponents in some embodiments. The changes in the alignment vector subcomponents can be utilized in real time as adjustments for target pointing or as boundary condition limits and may be stored in advanced to enable rapid access in application to both alignment and navigation during predetermined route of travel in some embodiments.

At an operation 414, alignment unit 148 provides planar adjustments to the alignment parameters (e.g., azimuth, elevation, pitch, roll and yaw) or alignment vector and applies the adjustments or the adjusted alignment vector to suspension unit 162 or navigation unit 164 (FIG. 2). In addition, the adjustments or adjusted alignment vector can be stored and can be used in operation 404 for alignment determination and operation 402 for platform position determination.

Flow diagram 400 can provide viable directional/alignment and navigational boundary limits and guidance adjustment measures regardless of the accuracy of any single subsystem element in some embodiments. In some embodiments, terrain database 146 (FIG. 3) is capable of providing slope error derivation of less than approximately 1-2 percent overall error and estimations of slopes with less than 1 degree elevation and related azimuth error are possible for application via flow 400 using appropriately resolute terrain database 146 information. This error is well within the published error levels of attitudinal sensing and feedback systems relying on real time sensors.

Figure 5:
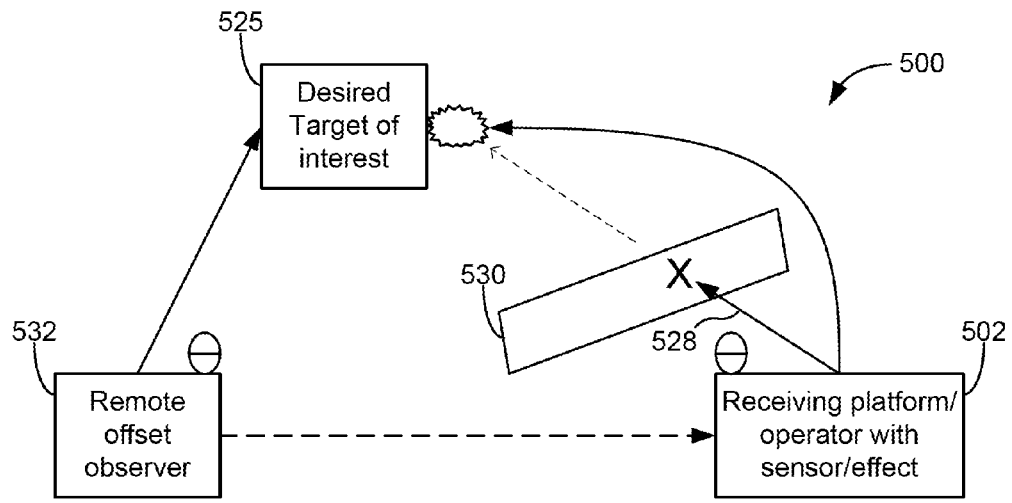
FIG. 5 is a schematic illustration of a target environment including a platform and a remote observer in accordance with an exemplary embodiment.

With reference to FIG. 5, a platform 502 can be utilized in an environment 500 to provide targeting of a desired target 525. Platform 502 can be a user or a platform similar to platform 102. In one or more embodiments, desired target 525 can be out of range, or obscured or in defilade, such as by a blocking element 530 (e.g, hill, smoke, weather, wall, or other obstruction) in a line of sight 528 between platform 502 and target 525.

Environment 500 can include a remote observer 532 that can determine a range and elevation to target 525 as observed from the position of remote observer 532. Environment 500 can include multiple targets 525, remote observers 532, and platforms 502. The position of target 525 can be calculated by remote observer 532 from the range, azimuth, and elevation from observer 532 to target 525 and the position of observer 532. The position of target 525 as observed by remote observer 532 is provided to platform 502 in some embodiments for aiming at target 525 using differencing of separately derived measurements between remote observer 532 and platform 502.

In some embodiments, platform 502 can determine its own position and the appropriate ballistic model available. In addition, platform 502 can determine alignment in elevation as well as azimuth to target 525 even though line of sight 528 is blocked or otherwise unavailable. Platform 502 can provide its position, position measurements, alignment, azimuth, and elevation measurements to remote observer 532. In addition, ballistic models available for platform 502 can be provided to remote observer 532. The ballistic model information can include unique effects or other information.

Remote observer 532 can utilize a position difference based estimation of platform 502 relative to remote observer 532. Remote observer 532 performs a difference position estimate (e.g., target, range and azimuth estimate and ballistic model) to develop a target location and related azimuth/elevation objectives relative to platform 502 in some embodiments. Remote observer 532 can provide adjustments to the current alignment of platform 502 or provide absolute alignment parameters to platform 502. Information from remote observer 532 includes a completed effect solution (e.g., fire solution or other solution) and related information in one or more embodiments. Platform 502 can apply manual or automatic azimuth and elevation guidance adjustments in response to the information provided from observer 532. In one or more embodiments, approval for action to target 525 can be provided to platform 502 manually or automatically via remote observer 532. Remote observer 532 can provide feedback for adjusting fire automatically and enable rapid fire control.

Remote observer 532 and platform 502 can utilize the alignments techniques discussed with reference to FIGS. 1-4 in some embodiments.

Figure 6:
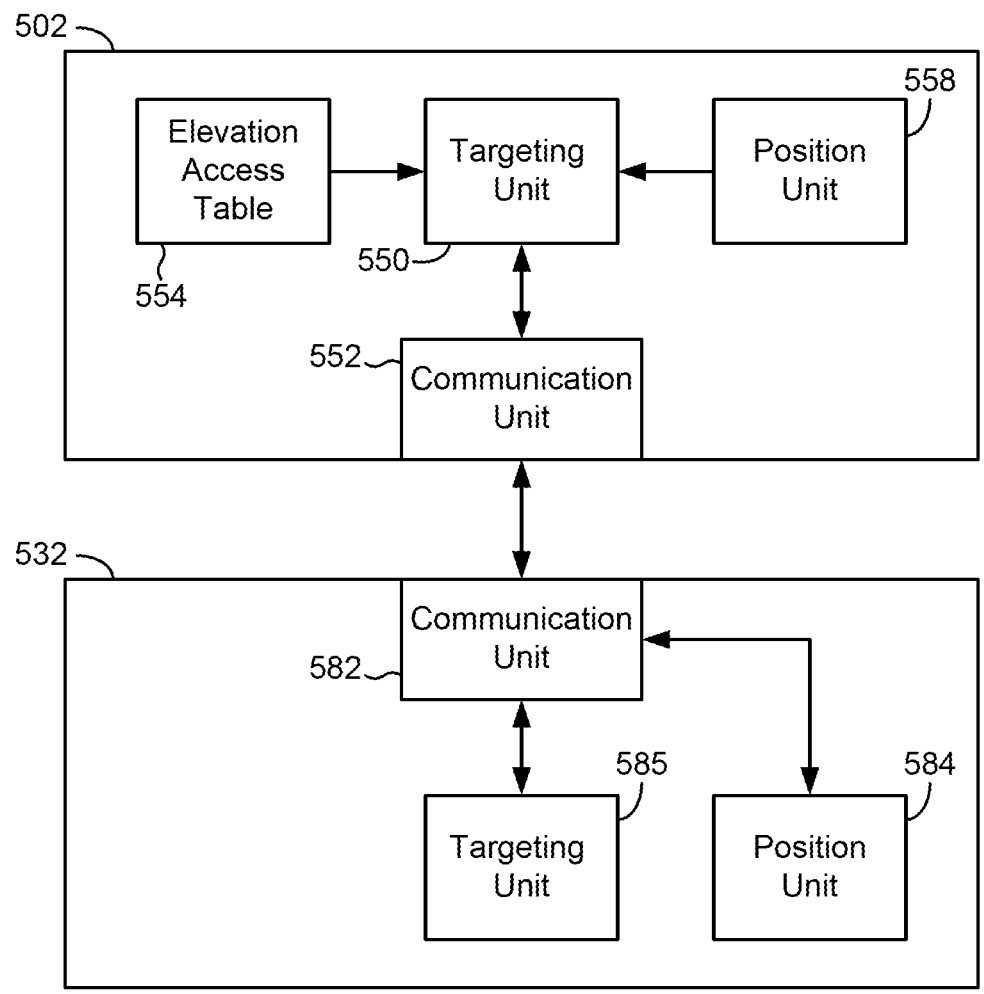
FIG. 6 is a block diagram of the platform and remote observer illustrated in FIG. 5, in accordance with an exemplary embodiment.

With reference to FIG. 6, remote observer 532 includes a communication unit 582, position unit 584, and a targeting unit 585, and platform 502 includes a targeting system 550, a communication unit 552, an elevation access table 554, and a position unit 558. Position units 584 and 558 can be similar to position unit 144 (FIG. 2) and provide data associated with the position of remote observer 532 and platform 502, respectively. Position units 584 and 558 may utilize a satellite-based positioning system to generate location data. Communication unit 552 and 582 can be used to communicate between remote observer 532 and platform 502 and can be data radio units.

Targeting unit 585 can be can be utilized to determine the position of target 525 and alignment to target. Targeting unit 585 can determine the position of target 525 based upon observations from remote observer 540 and the position of remote observer 532 provided by position unit 584. Targeting unit 585 can provide an alignment to target 585. Position can include a latitude, longitude and elevation or other grid-based representation.

Targeting units 550 and 585 can include a tilt sensor configured to determine an estimation of an elevation angle to target 525 relative to a horizontal direction. Targeting units 550 and 585 can include an azimuth sensor 606 configured to determine an azimuth to target 525. For example, the azimuth sensor may include a magnetic compass that determines the direction of magnetic north or a reference direction. The data generated by the azimuth sensor and/or tilt sensor may be used by targeting units 550 and 585 to determine the alignment to target 525. Targeting units 550 and 585 can include a range sensor configured to determine the range to target 525. In various implementations, the range sensor is an optical device or a laser or radar transmitter which transmits a laser or radar pulse towards a target. The range sensor may also include a receiver configured to receive the laser or radar pulse that is reflected from the target.

Targeting unit 585 can advantageously develop aiming adjustments (e.g., azimuth and elevation) as parameter derived from differencing azimuth and elevation to target 525 using positions of remote observer 540 and platform 502. Targeting unit 585 can provide the aiming adjustment to platform 502. Targeting unit 585 can independently provide aiming adjustments for multiple platforms in some embodiments. Targeting units 550 and 585 can be implemented as a computing platform executing software to perform the operations described herein in some embodiments. Elevation access table is a memory for storing targeting elevation data for use by targeting unit 550.

Figure 7A:
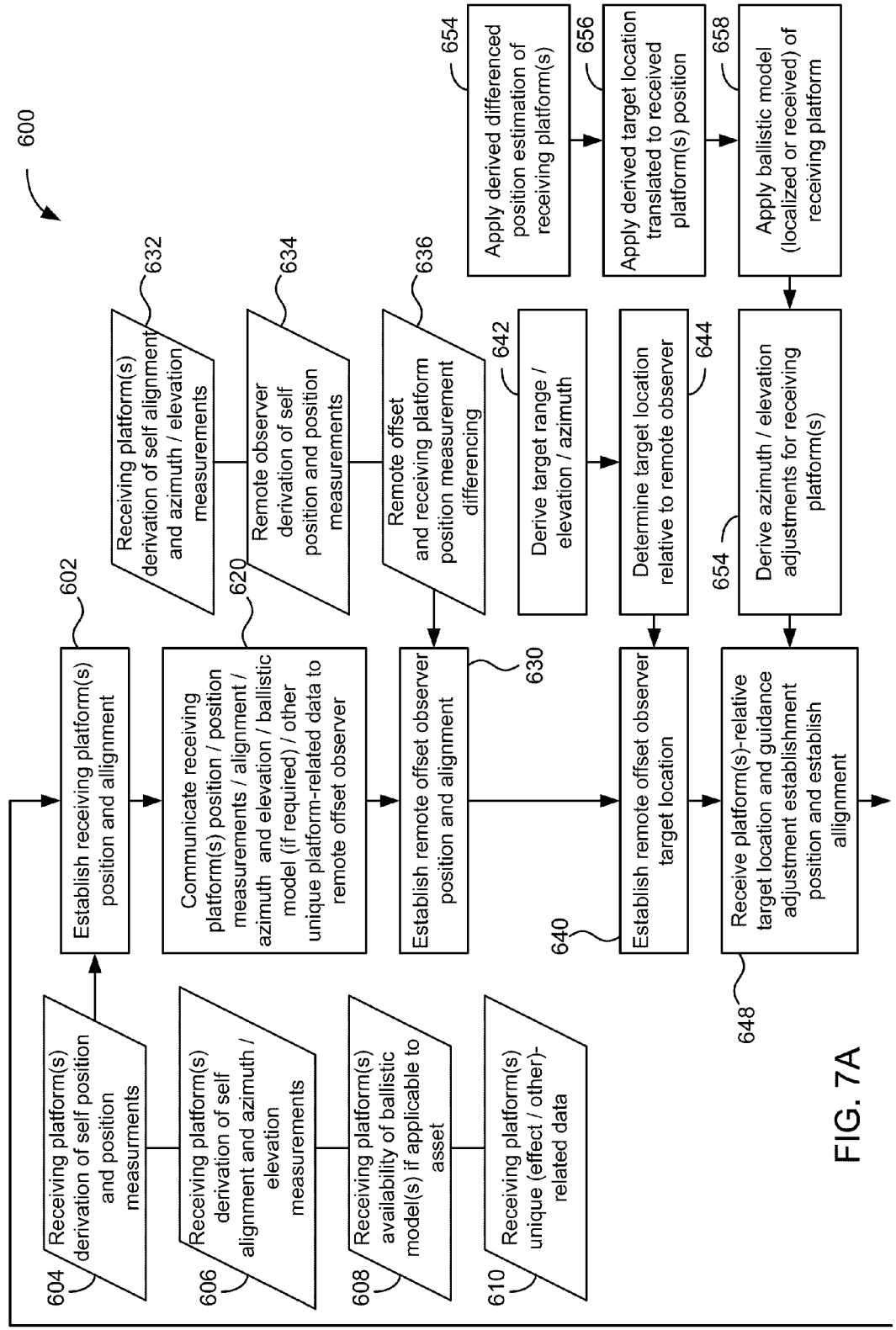
FIGS. 7A and 7B schematically illustrate a flow diagram of a targeting process for use by the platform and remote observer illustrated in FIG. 6, in accordance with an exemplary embodiment.
Figure 7B:
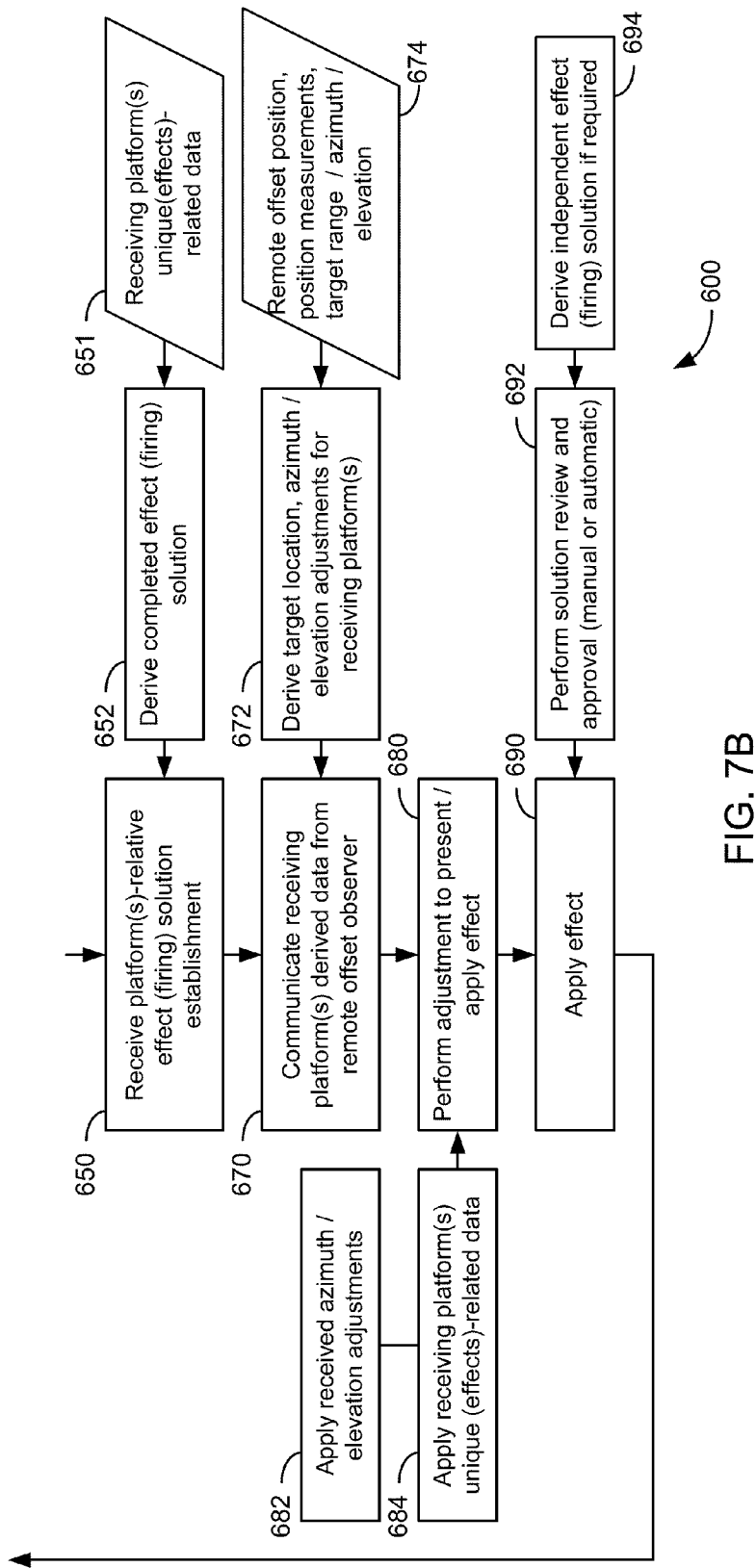

With reference to FIGS. 7A and 7B, targeting units 550 and 585 and platform 502 and remote observer 532 can operate according to flow diagram 600. At an operation 602, targeting unit 550 of platform 502 assembles information including the position of platform 502.

Position unit 558 of platform 502 determines position at an operation 604. Platform 502 derives its position via self-discovery (map/known location, GPS/GNSS/other position determination system) or offset observation of platform 502 and transmission of the position by an external resource in some embodiments. The position determining techniques discussed with respect to FIGS. 1-4 can be utilized to determine the position of platform.

At an operation 606, targeting unit 550 of platform 502 determines both an initial alignment vector (through execution of manual or automatically-provided methods including GPS/GNSS measurement difference alignment or related techniques) and the current attitudinal pose elements of the sensor/weapon/platform of interest relevant for the intended platform and effect. In some embodiments, the alignment data includes elevation (referenced to ground level) and azimuth (related to relative center or absolute north) through the application of any of the following: one or two axis inclinometer, on or off-platform manual estimation to target 525, magnetometer, on or off-weapon global satellite system navigation enabled methods or optical determination methods.

At an operation 608, ballistic models for platform 502 are determined if available. Unique effect and other related data is determined or received at an operation 610. The ballistic models, unique effect and other related data, alignment and attitudinal pose data, and position data in operations 604, 606, 608, and 610 can be combined and provided as position and alignment data in operation 602 in some embodiments.

At an operation 620, the position and alignment data from platform 502 is communicated to remote observer 532. This communication can be established via any available tactical methodology. In some embodiments, the communication can include co-locating grid/data information to enable the location of platform 502 to be similarly centric and avoid biases. In operation 620, platform 502 presents its position, position measurements (such as GPS/GNSS based range and phase measurements), alignment, and current azimuth and elevation measured attitude to remote observer 532 according to some embodiments. In addition, platform or effects-unique information (such as effects characteristics) may also be forwarded for the remote completion of fire reports or other relevant data in operation 620.

At an operation 630, remote observer 532 determines offset position and offset alignment. At an operation 632, the information provided in operation 620 is received. At an operation 634, the position and alignment of remote observer 532 is determined. Remote observer 532 independently derives its location, alignment, and current attitude via targeting unit 585 and position unit 584. The position and alignment for remote observer 532 can be determined similar to the determination operation 602 for platform 502. At an operation 636, differencing between remote observer 532 and platform 502 is performed. The differencing is used in operation 630.

At an operation 640, the position of target 525 is derived via application of direct observation methods such as visual, map matched, laser rangefinder/azimuthal pointing solution or other means performed by remote observer 532 in some embodiments. Operation 640 can be performed either in relative or absolute reference frames. At an operation 642, range, elevation and azimuth from remote observer 532 (e.g., using equipment associated with targeting unit 585) to target 525 can be determined. At an operation 644, the location of target 525 relative to remote observer 532 is determined using the range, elevation and azimuth from operation 642.

At an operation 648, the resulting position and platform adjustments for platform 502 are determined. Using the information provided from platform 502, remote observer 532 derives an error-reduced measurement-differenced position estimate of platform 502 relative to the remote observer 532. Relative error is reduced by linking the relative solution of platform 502 more directly to the measurements of the remote observer 532. The reduction in error is augmented if multiple platforms and observers are utilized. Depending on the effect/intent to be applied, the need for a ballistic trajectory adjustment may need to be applied such as those relevant for rifle launched grenade or mortar effects. Relevant assignment tables related to specific sensor/weapon/system trajectory attribute models (e.g. elevation settings for desired ranges based on modeled flight profile of select effect such as grenade or mortar shell) can be available from elevation access table 554 as communicated from platform 502 or via self-presence at remote observer 532. The ballistic adjustment attributes are applied to the elevation derivation from the location of remote observer 532 to the location of target 525. The attributes can be stored in digital form (such as a table or array of measurements) for access and use by a computing mechanism to perform the position and alignment calculations. By applying the derived target position to the received attitude information of platform 502 and including (if applicable) its unique ballistic effects model, specific azimuth and elevation adjustments for each independent receiving platform may then also be derived for immediate communication and application at each receiving platform. Additionally, specific effects characterization or action data relative to each platform may also be derived for further automation use in either communication of effect intent, evaluation/review of effect, or other related actions.

At an operation 654, the derived differenced position of platform 502 is applied for operation 648. At an operation 656, the derived location of target 525 translated to the position of platform 502 is applied for operation 648. At an operation 658, the ballistic model (if any) for platform 502 is applied for operation 648. At an operation 659, the derived azimuth and elevation adjustments for platform 502 is applied for operation 648.

At an operation 650, the platform relative target solution is determined. At an operation 652, the unique effects and relate data are applied to derive the completed effect or firing solution at an operation 654.

At an operation 670, the offset-derived target position and attitude data is communicated to platform 502. The derived target position, resolved (differenced) receiving platform position, and adjustments to azimuth and elevation to effect a complete targeting solution from the position of platform 502 is communicated from remote observer 532 to platform 502 for presentation of sensing or effects. This communication is established via any available tactical methodology with the key condition being the inclusion of collocating grid/datum information to enable the location of platform 502 to be similarly centric and avoid biases. As noted, additional data may also be sent for aiding automation of related fire/action support forms or other actions.

At an operation 680, the target position and attitude adjustments are applied to effect targeting by platform 502. The offset-derived target position and attitude information is applied to platform 502 either manually or directly (through remote or automatic application to adjustment elements for attitude mechanisms in an operation 682. Automatically mechanized azimuth and elevation controls on platform 502 can be directly remote controlled by the remote observer 532. The remote control is extendable from one to many receiving platforms similar to platform 502. Unique effects and related data can also be applied at platform 502 in operation 682.

At an operation 690, the effect as adjusted or provided in operation 680 is effected in an operation 690 by platform 502. An operation 694 can provide an independent effect or firing solution for review. The completed result is an alignment adjustment applicable to platform 502 to enable a directional presentation of effect via the applied ballistic trajectory and presented in guidance adjustment terms for elevation and azimuth. These guidance terms can be immediately applied via electronic transmission to platform 502 and targeting unit 550 and its alignment control system (if present) or manually through visual or other modality to then effect action (e.g. release of projectile). The completed adjustment solution may be first validated prior to effect action either manually or automatically at either remote observer 532 or platform 502 to maintain positive fire control enabled at either location at an operation 692.

Comparison to independently derived, current doctrinally enabled firing solutions performed by the platform 502 using only received target position information may be utilized as guidance or bounding of the final result. The effect release and other unique platform information may then be transmitted to the remote observer 532 for continued feedback and automatic provision of deriving adjustments to fire for any desired effects change remotely.

Figure 8:
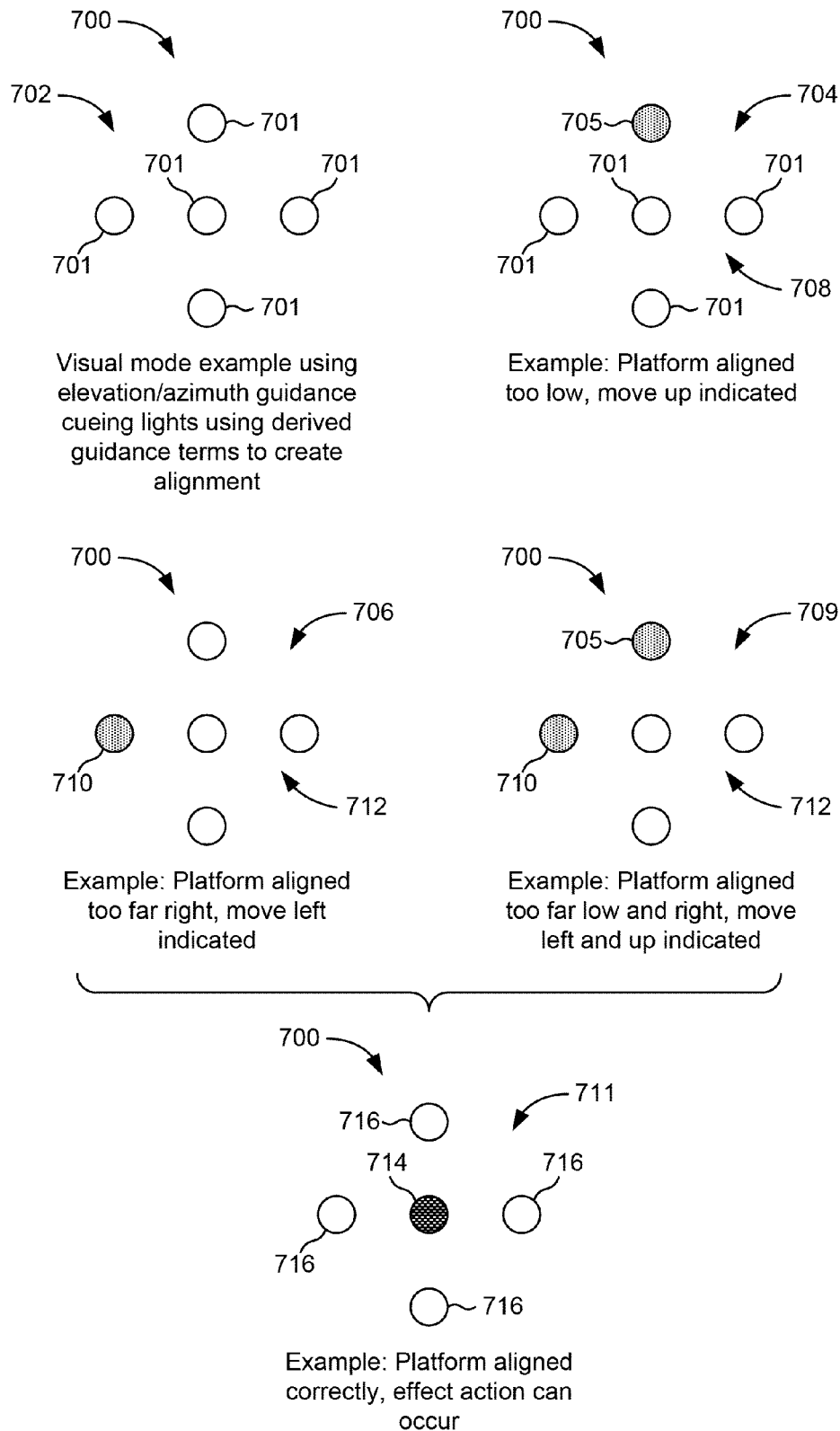
FIG. 8 is a schematic illustration of a display providing alignment guidance for the platform illustrated in FIG. 5 according to another exemplary embodiment.

With reference to FIG. 8, a display 700 can be provided at platform 502 Display 700 can be comprised of a number of icons 701 in some embodiments. Icons 701 can be provided with a first color or a second color or be clear, black or lit. Icons 701 are arranged in a form 702 resembling a plus sign in some embodiments.

In an arrangement 704, the top most icon 705 has indicia different than bottom most icons 708 indicating that platform 502 should be aligned in the upward direction because it is too low. In a pattern 706, the left most icon 710 has different indicia than right most icons 712 indicating that platform 502 is aligned too far to the right and should be moved in the direction to the left. Pattern 709 includes topmost icon 705 and left most Icon 710 having a different indicia than icons 712. Pattern 709 indicates that platform 502 is aligned too far low and to the right and should be moved left and up. Pattern 711 indicates that the platform is properly aligned as a center Icon 714 has different indicia than outside Icons 716. Accordingly, icons 701 can be utilized to indicate whether the platform should be moved up, down, up to the left, up to the right, down to the left, down to the right, to left, or to the right by providing indicia to one or more of icons 701.

Display 700 can be utilized as any sort of alignment guidance indicator for platform 502 or soldier mounted weapon. A grid display can be utilized with weapons for platforms or individuals, such as, grenade launchers, mortars, etc. The signals for controlling displays can be provided by targeting unit 150 targeting unit 150 can provide alignment adjustments as discussed I with reference to FIGS. 7A-B.

In some embodiments, a method of aligning a platform includes receiving first electronic data indicative of attitude of the platform and receiving second electronic data related to a position of the platform. The method also includes providing a slope vector associated with terrain electronic data in a terrain electronic database and providing third electronic data indicative of an adjusted attitude of the platform in response to the first electronic data and the slope vector. The slope vector is associated with the second electronic data. In some embodiments, the platform includes a main vehicle and a secondary platform, wherein the secondary platform includes a weapon or sensor, and the adjusted attitude is used to align the secondary platform. In some embodiments, the third electronic data may be applied to one or more secondary platform elements distributed from the main vehicle or main platform.

In some embodiments, a method of targeting includes providing first electronic data indicative of a position of a target at a remote observer and receiving second electronic data indicative of a position of a platform. The method also includes providing third electronic data to the platform using difference estimates associated with a position of the remote observer and the second electronic data. In some embodiments, the third electronic data includes adjustments or replacement of a position of target parameter for use by the receiving platform. In some embodiments, providing the third electronic data enables orientation or alignment in azimuth and elevation of a platform to a target without availability of line of sight to the target by the platform. In some embodiments, receiving the second electronic data and providing the third electronic data further includes determining the status of the platform. In some embodiments, receiving the second electronic data and providing the third electronic data further includes control of the platform. In some embodiments, the execution of the method is performed between one or more remote observer locations and one or more receiving platform locations. In some embodiments, the execution of the method performed between one or more remote observer locations and one or more receiving platform locations enables improvements to resulting measurements used for position, orientation, and alignment of each remote observer and receiving platform. In some embodiments, the method further includes displaying an alignment indicator for indicating proper aim to the target using the third electronic data. In various embodiments, the alignment indicator may be presented in a visual modality, an audio modality, and/or a tactile modality.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise a non-transitory medium, such as RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of aligning a platform, the method comprising:
   receiving first electronic data indicative of attitude of the platform;
   receiving second electronic data related to a position of the platform in response to a path of travel of the platform and the position of the platform, the second electronic data indicative of a current position of the platform and a future position of the platform;
   providing a slope vector associated with terrain electronic data of a terrain in a terrain electronic database, the slope vector being associated with the second electronic data, the slope vector based on a change in elevation between the current position of the platform and the future position of the platform across the terrain; and
   providing third electronic data indicative of an adjusted attitude of the platform in response to the first electronic data and the slope vector, the third electronic data being provided before real time traversal of the future position of the platform.

2. The method of claim 1, wherein the position of the platform is a geographic location determined using a satellite-based positioning system.

3. The method of claim 1, further comprising:
   adjusting alignment of the platform in response to the third electronic data.

4. The method of claim 1, wherein the attitude of the platform and the adjusted attitude of the platform comprise at least one of a yaw parameter, a roll parameter, or a pitch parameter.

5. The method of claim 1, wherein the platform comprises a main vehicle and a secondary platform, wherein the secondary platform comprises a weapon or sensor, and the adjusted attitude is used to align the secondary platform.

6. The method of claim 5, wherein the secondary platform is an independently rotating element.

7. The method of claim 5, further comprising:
   applying the slope vector to a heading parameter or a position parameter to improve a heading determination or a position determination without a sensor drift.

8. A system for aligning a platform, the system comprising:
   an attitude unit for providing first electronic data indicative of attitude of the platform;
   a position unit for providing second electronic data related to a position of the platform;
   a terrain electronic database for providing terrain data associated with terrain in a vicinity of the platform; and
   an alignment unit for providing third electronic data indicative of an adjusted attitude of the platform in response to the first electronic data and a slope vector based on a change in elevation between a current position of the platform and a future position of the platform across the terrain based on the terrain data.

9. The system of claim 8, wherein the alignment unit provides the third data for a turret or sensor.

10. The system of claim 8, wherein the first electronic data includes a heading parameter.

11. The system of claim 8, the slope vector is applied to a position parameter.

* * * * *